United States Patent
Ye et al.

(10) Patent No.: US 10,123,350 B2
(45) Date of Patent: Nov. 6, 2018

(54) COMMUNICATION DEVICE AND WIRELESS COMMUNICATION SYSTEM FOR HANDLING RANDOM ACCESS PROCEDURE

(71) Applicant: HTC Corporation, Taoyuan (TW)

(72) Inventors: Shiang-Rung Ye, Taoyuan (TW); Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 368 days.

(21) Appl. No.: 15/013,986

(22) Filed: Feb. 2, 2016

(65) Prior Publication Data
US 2016/0234861 A1    Aug. 11, 2016

Related U.S. Application Data

(60) Provisional application No. 62/112,659, filed on Feb. 6, 2015.

(51) Int. Cl.
*H04W 74/08* (2009.01)

(52) U.S. Cl.
CPC ... *H04W 74/0808* (2013.01); *H04W 74/0833* (2013.01); *H04W 74/08* (2013.01)

(58) Field of Classification Search
CPC . H04W 74/0808; H04W 74/08; H04W 74/00; H04W 74/0833
USPC ......................................................... 370/329
See application file for complete search history.

(56) References Cited

U.S. PATENT DOCUMENTS

| 2012/0300715 | A1 | 11/2012 | Pelletier | |
| 2013/0016659 | A1* | 1/2013 | Kone | H04W 36/0027 370/328 |
| 2014/0198729 | A1 | 7/2014 | Boström | |
| 2015/0049712 | A1* | 2/2015 | Chen | H04W 72/1215 370/329 |

(Continued)

FOREIGN PATENT DOCUMENTS

| CN | 103228026 A | * | 7/2013 |
| WO | 2013126858 A1 | | 8/2013 |
| WO | 2013127058 A1 | | 9/2013 |

OTHER PUBLICATIONS

European Search report dated Jun. 7, 2016 for EP application No. 16154395.4.

(Continued)

*Primary Examiner* — Rownak Islam
(74) *Attorney, Agent, or Firm* — Winston Hsu

(57) ABSTRACT

A communication device of a wireless communication system for handling a random access procedure includes a processing means and a storage unit. The processing means is used for executing a program. The storage unit, coupled to the processing means, is used for storing the program which instructs the processing means to perform the following steps: receiving a configuration message for the random access procedure from a network of the wireless communication system, wherein the configuration message configures the communication device to transmit a first random access preamble; performing a clear channel assessment (CCA) or listen before talk (LBT) operation before transmitting the first random access preamble; and increasing a preamble transmission counter of the first random access preamble by 1 when performing the CCA or LBT operation.

20 Claims, 8 Drawing Sheets

(56) References Cited

U.S. PATENT DOCUMENTS

| | | | |
|---|---|---|---|
| 2015/0057011 A1* | 2/2015 | Di Girolamo | H04W 74/0808 |
| | | | 455/454 |
| 2018/0035465 A1* | 2/2018 | Ahn | H04W 74/0833 |
| 2018/0249505 A1* | 8/2018 | Vajapeyam | H04B 17/318 |

OTHER PUBLICATIONS

Office action dated Aug. 21, 2017 for EP application No. 16154395.4, pp. 1-5.
3GPP Ts 36.321 v12.4.0, Dec. 2014.

* cited by examiner

COMMUNICATION DEVICE AND WIRELESS COMMUNICATION SYSTEM FOR HANDLING RANDOM ACCESS PROCEDURE

CROSS REFERENCE TO RELATED APPLICATIONS

This application claims the benefit of U.S. Provisional Application No. 62/112,659, filed on Feb. 6, 2015, the contents of which are incorporated herein by reference.

BACKGROUND OF THE INVENTION

1. Field of the Invention

The present invention relates to a communication device and method utilized in a wireless communication system, and more particularly, to a communication device and method for handling a random access procedure in a wireless communication system.

2. Description of the Prior Art

A long-term evolution (LTE) advanced (LTE-A) system is an evolution of the LTE system. The LTE-A system includes advanced techniques, such as carrier aggregation, licensed-assisted access (LAA) using LTE, etc.

For transmission in the LAA, listen before talk (LBT) may be needed. To meet the LBT requirement, a clear channel assessment (CCA) operation may be performed within a designated time period before a transmission is performed. In detail, the eNB may suspend a transmission on a downlink (DL) carrier in an unlicensed band for a first period to perform a first CCA operation on the DL carrier in the unlicensed band. In addition, the eNB may suspend another transmission for a second period and perform a second CCA operation for the second period, when the result of the first CCA operation indicates that the DL carrier is busy. Further, the UE may also suspend its transmission on a UL carrier in the unlicensed band for a third period and perform a third CCA operation on the UL carrier in the unlicensed band.

According to 3GPP TS 36.321, after a UE is assigned a dedicated random access preamble by an eNB, the UE transmits the preamble and then tries to receive a random access response (RAR) within a time period called an RAR window. If no RAR is received within the RAR window, or if none of the received RAR(s) contains a random access preamble identifier corresponding to the transmitted random access preamble, the RAR reception is considered unsuccessful. Therefore, the UE will increase the number of preamble transmission by 1 and try to transmit the preamble again. If the number of preamble retransmission exceeds a maximum value, the UE will consider that the random access procedure is not successfully completed. In such a condition, the eNB may know that the random access procedure is not successfully completed according to the RAR window and the maximum value for preamble retransmission, and therefore determine that the dedicated random access preamble can be assigned to another UE.

However, in the unlicensed bands, the UE has to follow a channel access mechanism (e.g., perform a CCA check or LBT) such as the load-based equipment or frame-based equipment before transmitting the random access preamble on an unlicensed carrier; this may introduce an unpredictable delay before the number of preamble transmission reaches the maximum value. As a result, the eNB may not know whether the UE finishes the random access procedure or not.

SUMMARY OF THE INVENTION

It is therefore an objective of the present invention to provide a communication device and method capable of handling a random access procedure for an unlicensed band to solve the abovementioned problem.

The present invention discloses a communication device of a wireless communication system, for handling a random access procedure. The communication device comprises a processing means and a storage unit. The processing means is used for executing a program. The storage unit, coupled to the processing means, is used for storing the program which instructs the processing means to perform the following steps: receiving a configuration message for the random access procedure from a network of the wireless communication system, wherein the configuration message configures the communication device to transmit a first random access preamble; performing a clear channel assessment (CCA) or listen before talk (LBT) operation before transmitting the first random access preamble; and increasing a preamble transmission counter of the first random access preamble by 1 when performing the CCA or LBT operation.

The present invention further discloses a communication device of a wireless communication system, for handling a random access procedure. The communication device comprises a processing means and a storage unit. The processing means is used for executing a program. The storage unit, coupled to the processing means, is used for storing the program which instructs the processing means to perform the following steps: receiving a configuration message for the random access procedure from a network of the wireless communication system, wherein the configuration message configures the communication device to transmit a first random access preamble; starting a timer with a timer value and performing a CCA or LBT operation before transmitting the first random access preamble; and stopping the timer when receiving a random access response corresponding to the first random access preamble, or determining that the random access procedure is not successfully completed and terminating the random access procedure when the timer expires.

The present invention further discloses a wireless communication system for handling a random access procedure. The wireless communication system comprises a network and a communication device. The network comprises a first processing means for executing a first program, and a first storage unit coupled to the first processing means. The first storage unit is used for storing the first program which instructs the first processing means to perform the following steps: transmitting a configuration message to the communication device for a random access procedure; starting a first timer with a first timer value; and determining that the random access procedure is not successfully completed when failing to receive a first random access preamble before the first timer expires. The communication device comprises a second processing means for executing a second program, and a second storage unit coupled to the second processing means. The second storage unit is used for storing the second program which instructs the second processing means to perform the following steps: receiving the configuration message from the network, wherein the configuration message configures the communication device to transmit the first random access preamble; starting a second timer with a second timer value and performing a CCA or LBT operation before transmitting the first random access preamble; and stopping the second timer when receiving a random access response corresponding to the first random access preamble, or determining that the random access procedure is not successfully completed and terminating the random access procedure when the second timer expires.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
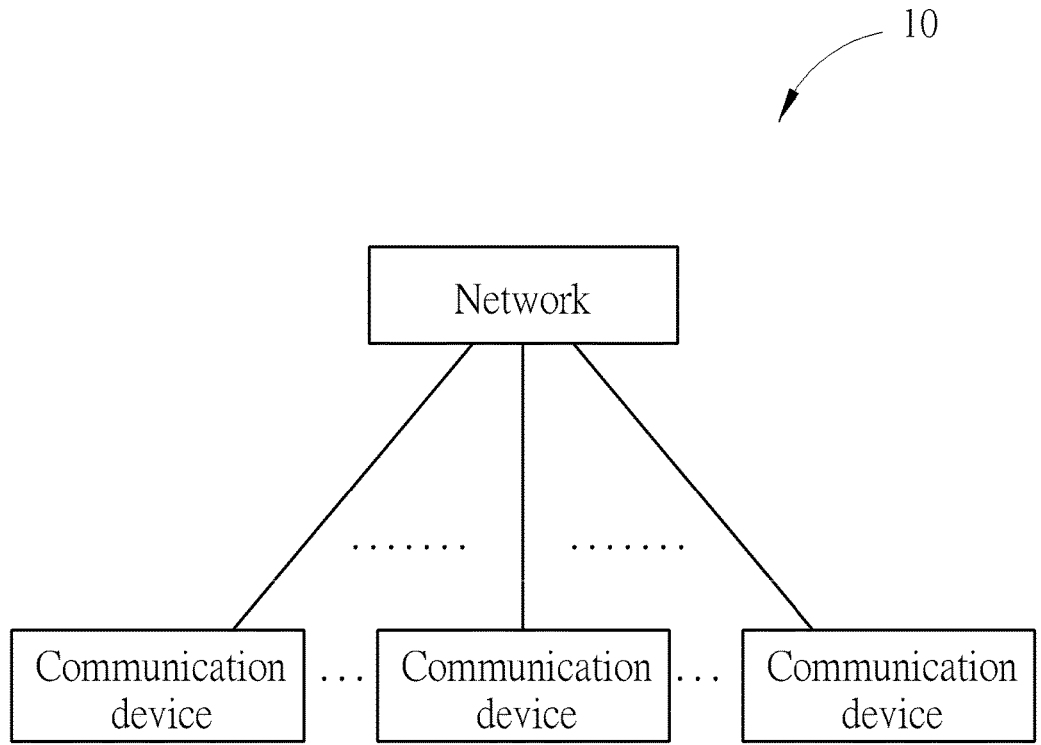
FIG. 1 is a schematic diagram of a wireless communication system according to an example of the present invention.

Please refer to FIG. 1, which is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may simultaneously communicate with each other via multiple cells (e.g., multiple carriers) including a primary cell (PCell) and one or more secondary cells (SCells). The PCell may be operated on licensed carrier(s), while the SCell may be operated on unlicensed carrier(s).

In FIG. 1, the network and the communication devices are simply utilized for illustrating the structure of the wireless communication system 10. Practically, the network may be an evolved-UTRAN (E-UTRAN) including at least one eNB and/or at least one relay in a LTE system, an LTE-A system or an evolution of the LTE-A system.

A communication device may be a UE, a mobile phone, a tablet computer, an electronic book, a portable computer system or a vehicle. In addition, the network and the communication device can be seen as a transmitter or a receiver. For an uplink, the communication device is the transmitter and the network is the receiver, and for a downlink, the network is the transmitter and the communication device is the receiver.

Figure 2:
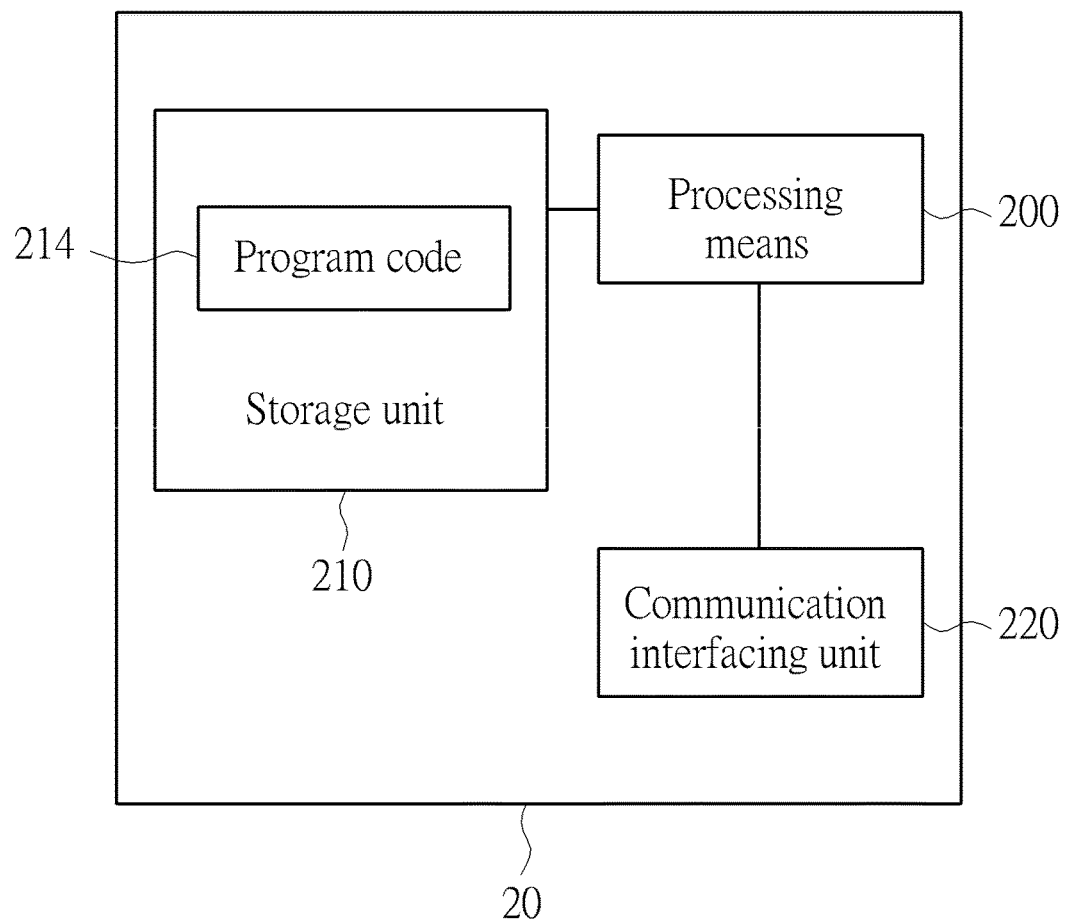
FIG. 2 is a schematic diagram of a communication device according to an example of the present invention.

Please refer to FIG. 2, which is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit, a storage unit 210 and a communication interfacing unit 220. The storage unit 210 may be any data storage device that may store a program code 214, accessed and executed by the processing means 200. Examples of the storage unit 210 include but are not limited to a subscriber identity module, read-only memory, flash memory, random-access memory, hard disk, optical data storage device, non-volatile storage unit, non-transitory computer-readable medium (e.g., tangible media), etc. The communication interfacing unit 220 is preferably a transceiver and is used to transmit and receive signals (e.g., data, messages and/or packets) according to processing results of the processing means 200.

For the sake of simplicity, a UE and an eNB in the following examples are used for illustrating the communication device and the network, respectively. It should be noted that the scope of the invention is not limited thereto.

Figure 3:
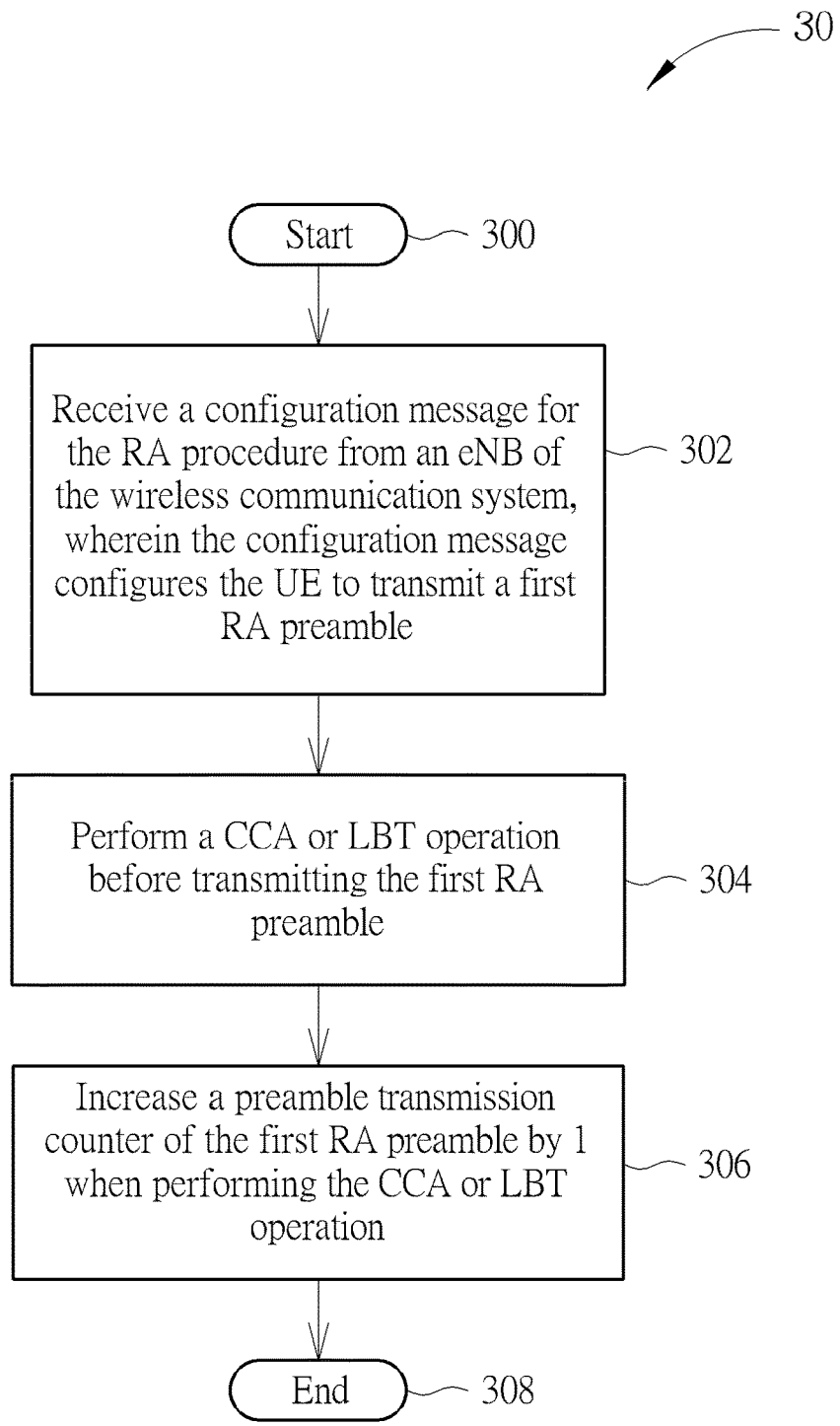
FIG. 3 is a flowchart of a process according to an example of the present invention.

Please refer to FIG. 3, which is a flowchart of a process 30 according to an example of the present invention. The process 30 may be utilized in a UE of a wireless communication system, to handle a RA procedure for an unlicensed band. The process 30 may be compiled into the program code 214 and includes the following steps:

Step 300: Start.

Step 302: Receive a configuration message for the RA procedure from an eNB of the wireless communication system, wherein the configuration message configures the UE to transmit a first RA preamble.

Step 304: Perform a CCA or LBT operation before transmitting the first RA preamble.

Step 306: Increase a preamble transmission counter of the first RA preamble by 1 when performing the CCA or LBT operation.

Step 308: End.

In a contention-free RA, the eNB may assign a dedicated preamble for the UE. According to the process 30, the UE may receive a configuration message for the RA procedure from the eNB, where the configuration message configures the UE to transmit the first RA preamble which has a preamble index assigned by the eNB (Step 302). In this example, the RA procedure is performed on an unlicensed band, so the UE should perform the CCA or LBT operation using energy detection before transmitting the first RA preamble (Step 304). The UE may increase the preamble transmission counter by 1 when performing the CCA or LBT operation (Step 306). When the preamble transmission counter exceeds its maximum value, the UE considers that the RA procedure is not successfully completed and terminates the RA procedure.

In contrast to the legacy RA procedure where the UE increases the preamble transmission counter by 1 when transmitting the first RA preamble, in the present invention, the UE may increase the preamble transmission counter by 1 when performing the CCA or LBT operation irrespective of whether the first RA preamble is allowed to be transmitted. When performing CCA or LBT, the UE determines whether the UL carrier is occupied according to the detected energy level. If the energy level detected on the UL carrier is below a CCA threshold, the UE will determine that the UL carrier is free; or if the energy level detected on the UL carrier is higher than the CCA threshold, the UE will determine that the UL carrier is occupied and suspend the preamble transmission until determining that the UL carrier becomes free.

Figure 4:
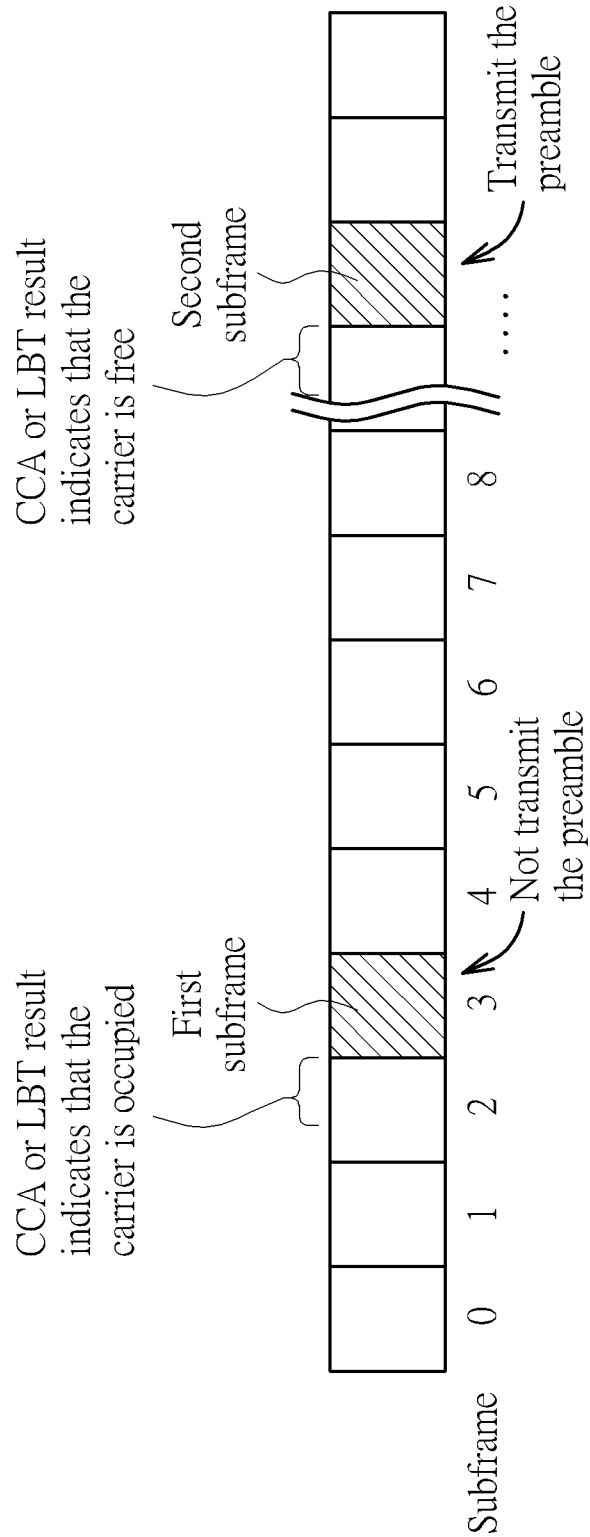
FIG. 4 is a schematic diagram of preamble transmission on an unlicensed carrier according to an example of the present invention.

For example, as shown in FIG. 4, if the UE is configured to transmit the first RA preamble in a first subframe (e.g., subframe 3) and an unlicensed carrier according to the configuration message from the eNB, the UE may not transmit the first RA preamble in the first subframe if the UE determines that the unlicensed carrier is occupied according to the CCA or LBT result. Until the UE detects that the unlicensed carrier is not occupied by other transmission, the UE may transmit a second RA preamble on a second subframe.

Figure 5:
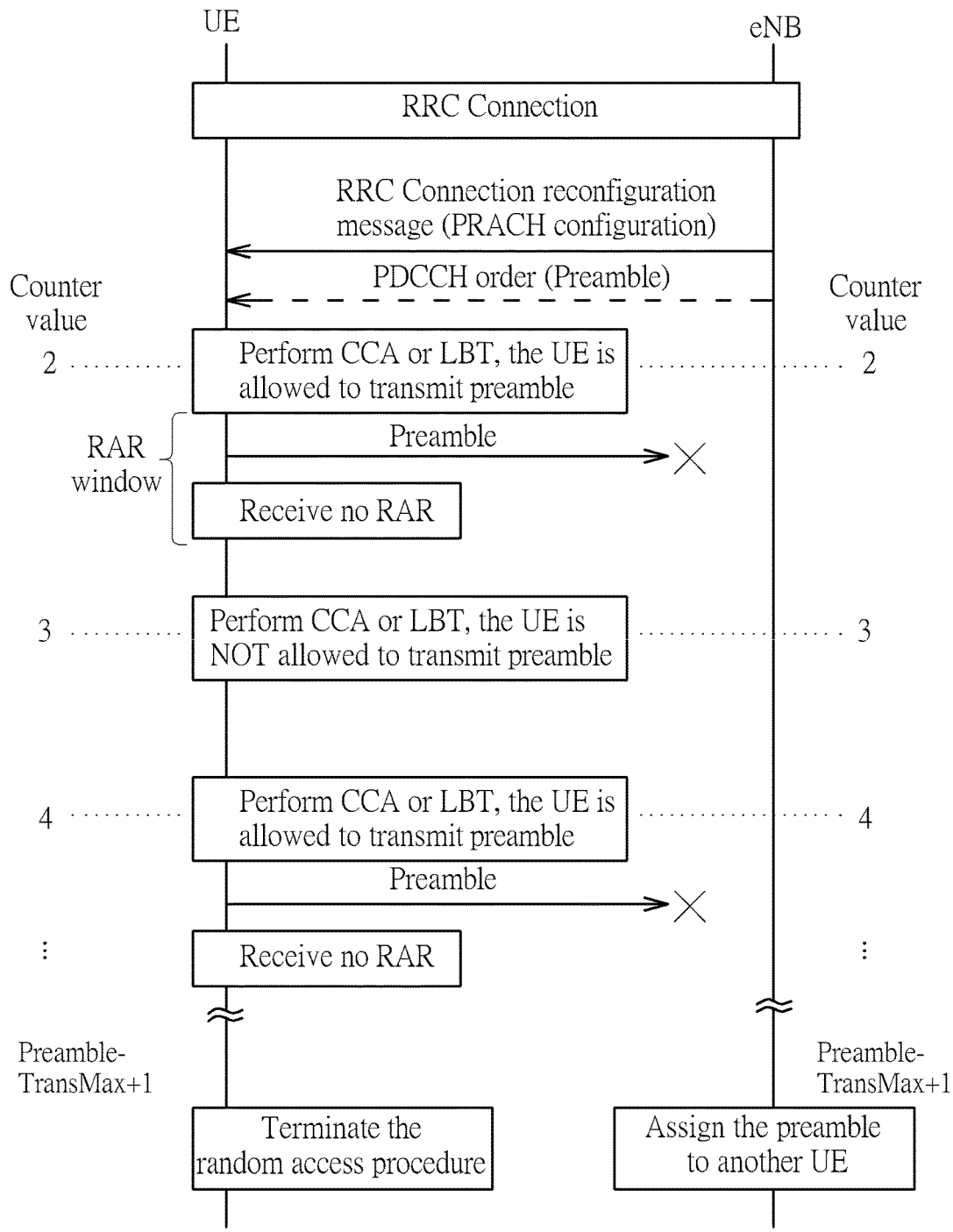
FIG. 5 is a schematic diagram of signal flows of a random access procedure according to an example of the present invention.

Please refer to FIG. 5, which is a schematic diagram of signal flows of a RA procedure according to an example of the present invention. The eNB may transmit an RRC connection reconfiguration message to the UE via the PCell. The RRC connection reconfiguration message configures the UE to add a SCell on an unlicensed carrier. The eNB may also transmit a physical downlink control channel (PDCCH) order which includes a dedicated preamble to the UE. When the UE receives the PDCCH order, the UE may perform a RA procedure on the SCell and try to transmit the dedicated preamble in subframe(s). The maximum value of the preamble transmission counter is also included in the RRC connection reconfiguration message.

The UE may try to transmit the RA preamble by performing the CCA or LBT operation. No matter whether the UE is allowed to transmit the RA preamble, the preamble transmission counter is increased by 1 (i.e., the counter value becomes 2). If the UE successfully transmits the RA preamble, after the preamble transmission, the UE will monitor the channel and detect whether a corresponding RAR is received during an RAR window. If the RAR is not received during the RAR window, the UE may try to transmit another RA preamble by performing the CCA or LBT operation. The transmission power of this RA preamble may be equal to the transmission power of the latest transmitted RA preamble plus a power ramping step. Alternatively, if the transmission power of the latest transmitted RA preamble plus the power ramping step exceeds predefined maximum power (i.e., $P_{CMAX,c}$ as predefined in the 3GPP specification), the UE will try to transmit this preamble via the maximum power.

If the UE is not allowed to transmit the RA preamble according to the CCA or LBT result, the UE may keep monitoring the unlicensed carrier to see when the carrier is free. When the carrier becomes free, the UE may try to transmit the preamble by performing CCA and LBT operation and increase the transmission counter by 1. Subsequently, when the counter value reaches preambleTransMax+1, the UE will determine that the RA procedure is not successfully completed and thereby terminate the RA procedure.

Please note that in the above example shown in FIG. 5, the RA preamble is a dedicated preamble configured in the PDCCH order. In practice, the dedicated preamble may be configured via any type of configuration message transmitted from the eNB, where the configuration message may be included in the PDCCH order, a media access control (MAC) control element or an RRC message such as the RRC connection reconfiguration message.

Figure 6:
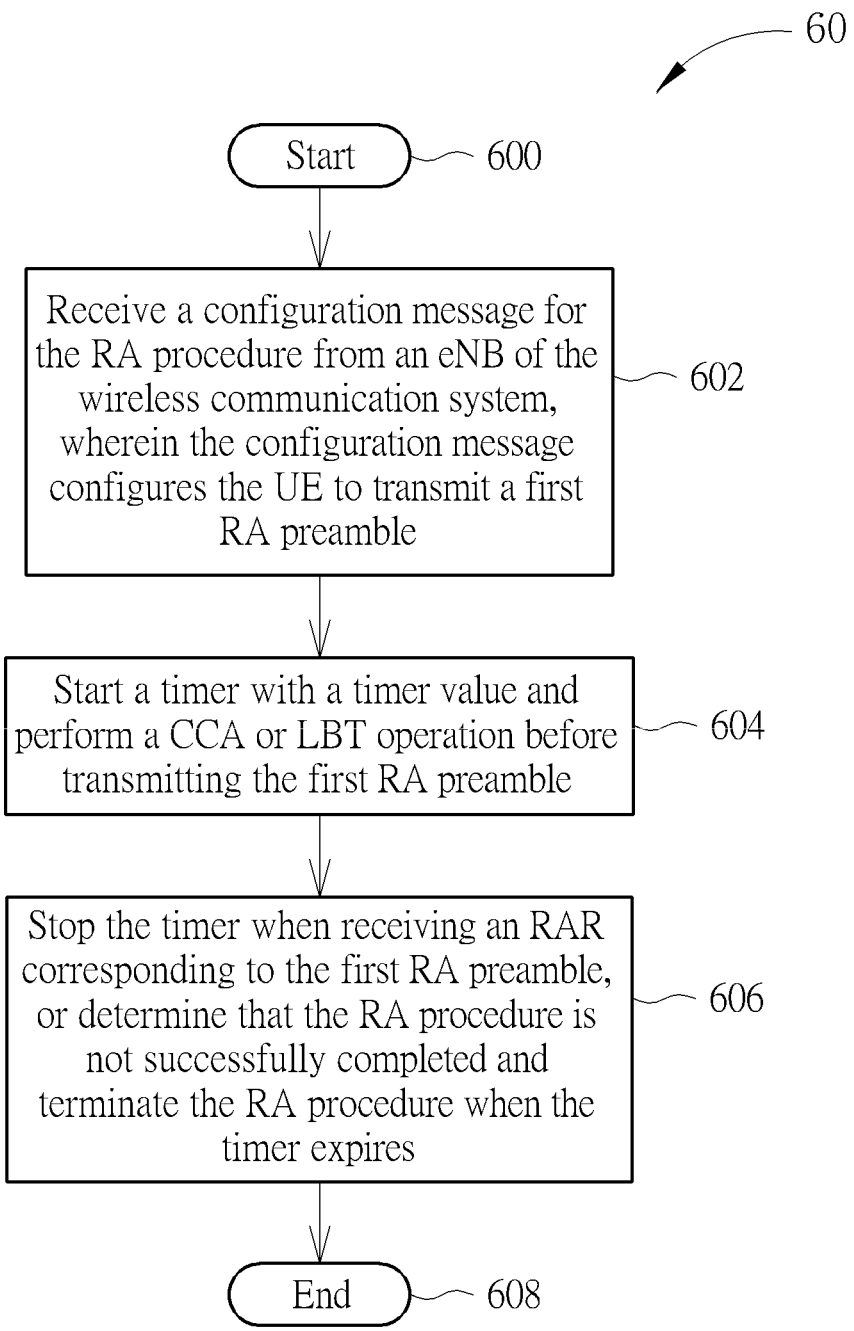
FIG. 6 is a flowchart of a process according to another example of the present invention.

Please refer to FIG. 6, which is a flowchart of a process 60 according to another example of the present invention. The process 60 may be utilized in a UE (e.g., the communication device in FIG. 1) of a wireless communication system, to handle a RA procedure for an unlicensed band.

The process 60 may be compiled into the program code 214 and includes the following steps:

Step 600: Start.

Step 602: Receive a configuration message for the RA procedure from an eNB of the wireless communication system, wherein the configuration message configures the UE to transmit a first RA preamble.

Step 604: Start a timer with a timer value and perform a CCA or LBT operation before transmitting the first RA preamble.

Step 606: Stop the timer when receiving an RAR corresponding to the first RA preamble, or determine that the RA procedure is not successfully completed and terminate the RA procedure when the timer expires.

Step 608: End.

According to the process 60, the UE may receive a configuration message for the RA procedure from the eNB, where the configuration message configures the UE to transmit the first RA preamble which has a preamble index assigned by the eNB (Step 602). In this example, the RA procedure is performed on an unlicensed band, so the UE should perform the CCA or LBT operation before transmitting the first RA preamble (Step 606). The UE may receive a timer value from the eNB, where the timer value is used for defining the maximum allowable time for the UE to transmit the preamble. Another embodiment is that the timer value is pre-defined in the UE so there is no need to configure the UE with the timer value. The UE may start a timer with the timer value when starting to perform the CCA or LBT operation. Another embodiment is to start the timer on receiving the configuration message which configures the UE to transmit the first RA preamble. The UE may then stop the timer when receiving an RAR corresponding to the first RA preamble. Alternatively, if the UE does not receive any corresponding RAR before the timer expires, or if none of the received RAR(s) contains a RA preamble identifier corresponding to the transmitted random access preamble, the UE may determine that the random access procedure is not successfully completed and terminate the random access procedure (Step 608).

In addition, the eNB may also start another timer with a timer value the same as or different from the timer value configured to the UE. This timer may be configured to expire at a time point close to the time point of the UE terminating the RA procedure.

Please note that, the timer value for the UE is preferably greater than or equal to an original time period for the UE to transmit the preamble, wherein the original time period starts when the preamble transmission counter starts from 1 and ends when the preamble transmission counter exceeds the maximum value (i.e., preambleTransMax) in the case where the CCA or LBT operation always indicates that the carrier is free. For example, the timer value may be configured to leave a margin time allowing the UE to wait until the carrier is free so the timer value is greater than the original time period.

Similarly, in this case, if the UE is configured to transmit the first RA preamble in a first subframe and an unlicensed carrier according to the configuration message from the eNB, the UE may not transmit the first RA preamble in the first subframe when determining that the unlicensed carrier is occupied according to the CCA or LBT result. Until the UE detects that the unlicensed carrier is not occupied by other transmission, the UE may transmit a second RA preamble on a second subframe before performing CCA or LBT. No matter when the UE performs the preamble transmission and increases the value of the preamble transmission counter, the UE still terminates the RA procedure when the timer expires.

Figure 7:
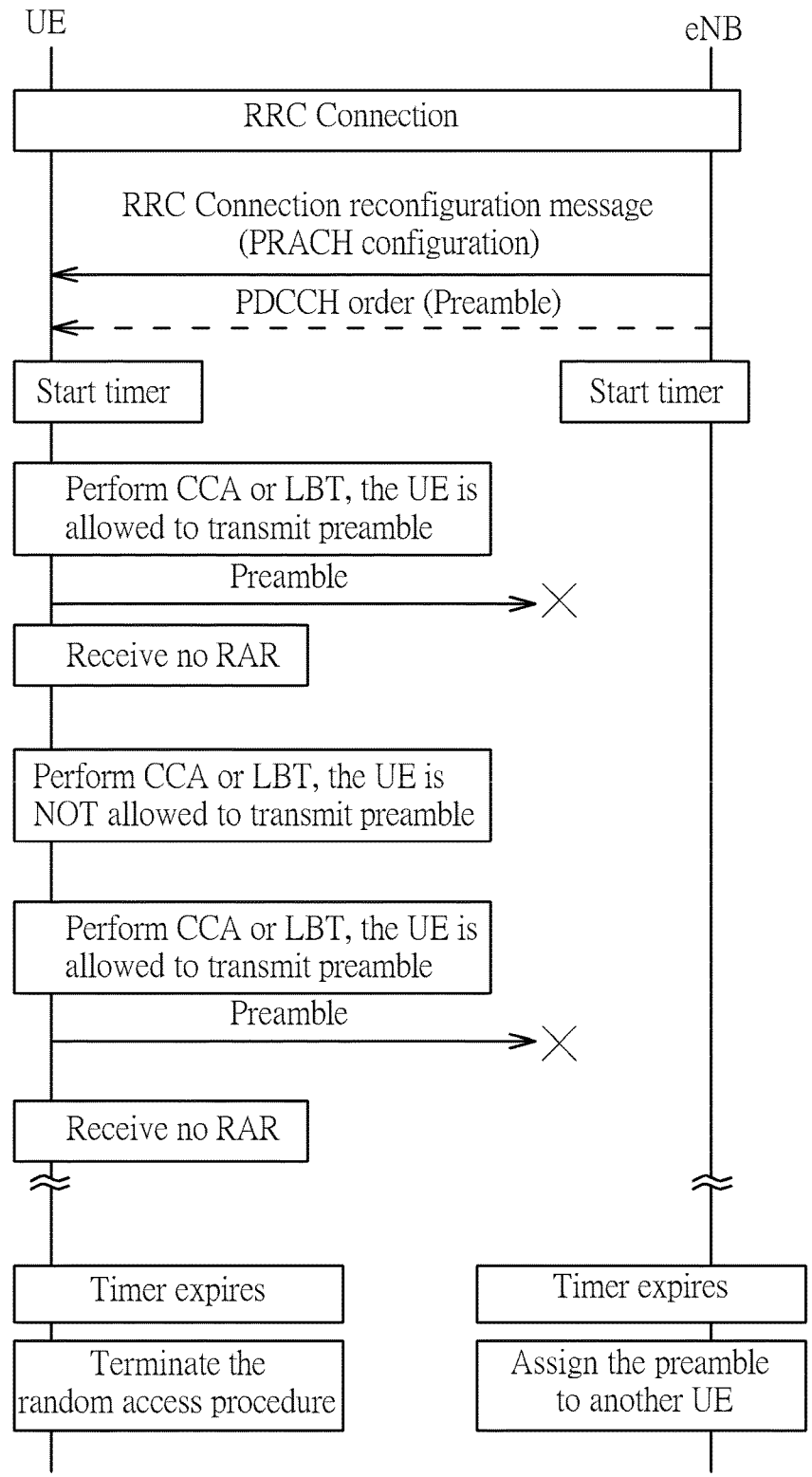
FIG. 7 is a schematic diagram of signal flows of a random access procedure according to an example of the present invention.

Please refer to FIG. 7, which is a schematic diagram of signal flows of a RA procedure according to an example of the present invention. As shown in FIG. 7, the eNB may transmit an RRC connection reconfiguration message which configures the UE to add a SCell on an unlicensed carrier, and a timer value for the UE to terminate an unsuccessful RA procedure. The eNB may transmit a PDCCH order which includes a dedicated preamble to the UE. When the UE receives the PDCCH order, the UE may perform a RA procedure on the SCell and try to transmit the dedicated preamble in subframe(s). The UE may determine the subframe(s) for transmitting the RA preamble according to the PRACH configuration included in the RRC connection reconfiguration message.

The UE receives the timer value from the eNB and starts the timer with the timer value when starting to perform the CCA or LBT operation. When the timer expires, the UE may consider that the RA procedure is not successfully completed and terminate the RA procedure. If the eNB transmits an RAR containing the preamble to the UE, the eNB stops the timer. Alternatively, the eNB may stop the timer after transmitting an RAR containing the preamble to the UE and receiving a physical uplink shared channel scheduled by a PDCCH downlink control information (DCI) from the UE. When the timer of the eNB expires, the eNB may determine that the UE fails to complete the RA procedure and the eNB may consider that the RA preamble is available for another UE.

Similarly, in the RA procedure, the UE may try to transmit the RA preamble by performing the CCA or LBT operation. If the UE successfully transmits the RA preamble, the UE will monitor the channel and detect whether a corresponding RAR is received during the RAR window. If the RAR is not received due to some reasons such as poor channel quality or severe interferences, the UE may try to transmit another RA preamble by performing the CCA or LBT operation.

Please note that in the above example shown in FIG. 7, the RA preamble is a dedicated preamble configured in the PDCCH order. In practice, the dedicated preamble may be configured via any type of configuration message transmitted from the eNB, where the configuration message may be included in the PDCCH order, a MAC control element or an RRC message such as the RRC connection reconfiguration message.

Figure 8:
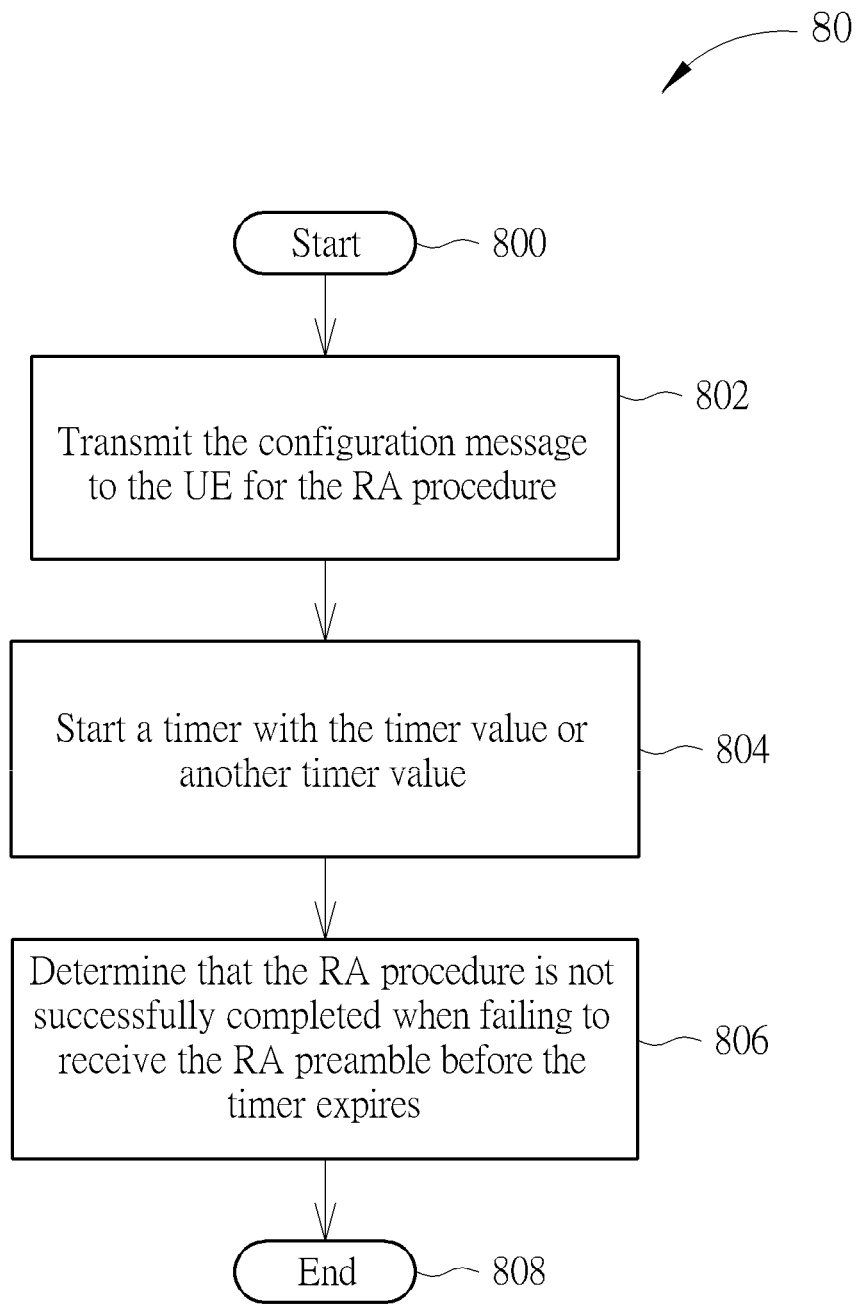
FIG. 8 is a flowchart of a process according to an example of the present invention.

The above operations of handling the RA procedure in the wireless communication system may also be summarized into another process 80 utilized in an eNB (e.g., the network in FIG. 1) of the wireless communication system, as shown in FIG. 8. The process 80 may be compiled into the program code 214 and includes the following steps:

Step 800: Start.

Step 802: Transmit the configuration message to the UE for the RA procedure.

Step 804: Start a timer with the timer value or another timer value.

Step 806: Determine that the RA procedure is not successfully completed when failing to receive the RA preamble before the timer expires.

Step 808: End.

It should be noted that although the above examples are illustrated based on the processes 30, 60 and 80, to clarify the operations of the UE and the eNB. The examples can be combined and/or modified arbitrarily according to system requirements and/or design considerations.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device of a wireless communication system for handling a random access procedure, the communication device comprising:
   a processor, for executing a program; and
   a memory, coupled to the processor, for storing the program which instructs the processor to perform the following steps:
   receiving a configuration message for the random access procedure from a network of the wireless communication system, wherein the configuration message configures the communication device to transmit a first random access preamble;
   performing a clear channel assessment (CCA) or listen before talk (LBT) operation before transmitting the first random access preamble; and
   increasing a preamble transmission counter of the first random access preamble by 1 every time when performing the CCA or LBT operation, irrespective of whether the first random access preamble is allowed to be transmitted.

2. The communication device of claim 1, wherein the preamble transmission counter is increased by 1 irrespective of whether the first random access preamble is successfully transmitted.

3. The communication device of claim 1, wherein the communication device is configured to transmit the first random access preamble in a first subframe and an unlicensed carrier according to the configuration message, and the program further instructs the processor to perform the following step:
   not transmitting the first random access preamble in the first subframe when determining that the unlicensed carrier is occupied according to the CCA or LBT operation.

4. The communication device of claim 3, wherein the program further instructs the processor to perform the following step:
   transmitting a second random access preamble in a second subframe when determining that the unlicensed carrier is not occupied according to the CCA or LBT operation.

5. The communication device of claim 4, wherein transmission power of the second random access preamble is equal to transmission power of a third random access preamble latest transmitted plus a power ramping step, or equal to predefined maximum power.

6. The communication device of claim 1, wherein the first random access preamble is a dedicated preamble configured by the configuration message, which is comprised in a physical downlink control channel (PDCCH) order, a media access control (MAC) control element or a radio resource control (RRC) message.

7. The communication device of claim 1, wherein the communication device is configured to initiate the random access procedure on an unlicensed carrier due to reception of the configuration message, which is comprised in a PDCCH order, a MAC control element or an RRC message.

8. A communication device of a wireless communication system for handling a random access procedure, the communication device comprising:
a processor, for executing a program; and
a memory, coupled to the processor, for storing the program which instructs the processor to perform the following steps:
receiving a configuration message for the random access procedure from a network of the wireless communication system, wherein the configuration message configures the communication device to transmit a first random access preamble;
starting a timer with a timer value when starting to perform a clear channel assessment (CCA) or listen before talk (LBT) operation before transmitting the first random access preamble, irrespective of whether the first random access preamble is allowed to be transmitted and the first random access preamble is successfully transmitted; and
stopping the timer when receiving a random access response corresponding to the first random access preamble, or determining that the random access procedure is not successfully completed and terminating the random access procedure when the timer expires.

9. The communication device of claim 8, wherein the random access procedure is terminated when the timer expires irrespective of whether a preamble transmission counter of the first random access preamble exceeds a maximum value.

10. The communication device of claim 8, wherein communication device is configured to transmit the first random access preamble in a first subframe and an unlicensed carrier according to the configuration message, and the program further instructs the processor to perform the following step:
not transmitting the first random access preamble in the first subframe when determining that the unlicensed carrier is occupied according to the CCA or LBT operation.

11. The communication device of claim 10, wherein the program further instructs the processor to perform the following step:
transmitting a second random access preamble in a second subframe when determining that the unlicensed carrier is not occupied according to the CCA or LBT operation.

12. The communication device of claim 11, wherein transmission power of the second random access preamble is equal to transmission power of a third random access preamble latest transmitted plus a power ramping step, or equal to predefined maximum power.

13. The communication device of claim 8, wherein the first random access preamble is a dedicated preamble configured by the configuration message, which is comprised in a physical downlink control channel (PDCCH) order, a media access control (MAC) control element or a radio resource control (RRC) message.

14. The communication device of claim 8, wherein the communication device is configured to initiate the random access procedure on an unlicensed carrier due to reception of the configuration message, which is comprised in a PDCCH order, a MAC control element or an RRC message.

15. A wireless communication system for handling a random access procedure, the wireless communication system comprising a network and a communication device, the network comprising:
a first processor, for executing a first program; and
a first memory, coupled to the first processor, for storing the first program which instructs the first processor to perform the following steps:
transmitting a configuration message to the communication device for a random access procedure;
starting a first timer with a first timer value; and
determining that the random access procedure is not successfully completed when failing to receive a first random access preamble before the first timer expires; and
the communication device comprising:
a second processor, for executing a second program; and
a second memory, coupled to the second processor, for storing the second program which instructs the second processor to perform the following steps:
receiving the configuration message from the network, wherein the configuration message configures the communication device to transmit the first random access preamble;
starting a second timer with a second timer value when starting to perform a clear channel assessment (CCA) or listen before talk (LBT) operation before transmitting the first random access preamble, to be transmitted and the first random access preamble is successfully transmitted; and
stopping the second timer when receiving a random access response corresponding to the first random access preamble, or determining that the random access procedure is not successfully completed and terminating the random access procedure when the second timer expires.

16. The wireless communication system of claim 15, wherein the random access procedure is terminated when the second timer expires irrespective of whether a preamble transmission counter of the first random access preamble exceeds a maximum value.

17. The wireless communication system of claim 15, wherein the communication device is configured to transmit the first random access preamble in a first subframe and an unlicensed carrier according to the configuration message, and the second program further instructs the second processor to perform the following step:
not transmitting the first random access preamble in the first subframe when determining that the unlicensed carrier is occupied according to the CCA or LBT operation.

18. The wireless communication system of claim 17, wherein the second program further instructs the second processor to perform the following step:
transmitting a second random access preamble in a second subframe when determining that the unlicensed carrier is not occupied according to the CCA or LBT operation.

19. The wireless communication system of claim 18, wherein transmission power of the second random access preamble is equal to transmission power of a third random access preamble latest transmitted plus a power ramping step, or equal to predefined maximum power.

20. The wireless communication system of claim 15, wherein the first random access preamble is a dedicated preamble configured by the configuration message, which is comprised in a physical downlink control channel (PDCCH) order, a media access control (MAC) control element or a radio resource control (RRC) message.

* * * * *